United States Patent [19]
Chen

[11] Patent Number: 5,778,747
[45] Date of Patent: Jul. 14, 1998

[54] POWER SAW HAVING AN ERGONOMICALLY-DESIGNED HANDLE AND SAFETY SWITCH

[75] Inventor: Ruey-Zon Chen, Taichung, Taiwan

[73] Assignee: Rexon Industrial Corp., Ltd., Taichung, Taiwan

[21] Appl. No.: 754,629

[22] Filed: Nov. 21, 1996

[51] Int. Cl.⁶ ................................................. B27B 5/38
[52] U.S. Cl. .............................. 83/471.3; 83/490; 83/581; 30/388; 30/514
[58] Field of Search .......................... 83/471.3, 490, 83/581, 397, 478, 399; 30/388, 381, 392, 382, 125, 514

[56] References Cited

U.S. PATENT DOCUMENTS

| | | | |
|---|---|---|---|
| 1,395,957 | 11/1921 | Griffin | 30/514 |
| 3,746,813 | 7/1973 | Brown | 200/157 |
| 3,746,815 | 7/1973 | Drummer | 280/157 |
| 3,886,658 | 6/1975 | Wikoff | 30/388 |
| 4,181,057 | 1/1980 | Bassett | 83/471.3 |
| 4,694,721 | 9/1987 | Brickner, Jr. | 83/471.3 |
| 4,757,786 | 7/1988 | Ellegard | 123/2 |
| 4,869,142 | 9/1989 | Sato et al. | 83/467.1 |
| 4,934,233 | 6/1990 | Brundage et al. | 83/397 |
| 5,042,348 | 8/1991 | Brundage et al. | 83/471.3 |
| 5,046,390 | 9/1991 | Sasaki | 83/471.2 |
| 5,054,352 | 10/1991 | Fushiya et al. | 83/468.3 |
| 5,094,000 | 3/1992 | Becht et al. | 30/382 |
| 5,181,448 | 1/1993 | Terpstra | 83/468.3 |
| 5,189,937 | 3/1993 | Gariglieri | 83/471.3 |
| 5,272,813 | 12/1993 | Wolf et al. | 30/381 |
| 5,370,025 | 12/1994 | Itzov | 83/397 |
| 5,425,294 | 6/1995 | Ushiwata et al. | 83/471.3 |
| 5,570,512 | 11/1996 | Hoppner | 30/381 |
| 5,579,584 | 12/1996 | Hoffman | 83/478 |

FOREIGN PATENT DOCUMENTS 1301975  8/1969  Germany ................... 30/388

OTHER PUBLICATIONS

Sears, Roebuck and Co., *Sears Owner's Manual*, "Sears/Craftsman 10 Inch Miter Saw", pp. 26–29, Aug. 1995.
Advertisement for Sears/Craftsman® Miter Saws, 1 page, 1996.

*Primary Examiner*—Maurina T. Rachuba
*Attorney, Agent, or Firm*—McCormick, Paulding & Huber

[57] ABSTRACT

In a power saw, such as a power miter saw or chop saw, an approximately planar work surface is provided for supporting a workpiece, a frame is pivotally mounted adjacent to the work surface, and a blade is rotatably supported on the frame above the work surface. The frame and blade are pivotable between an upper, non-work position spaced away from the work surface, and a lower, work position located toward the work surface for engaging with the blade a workpiece supported on the work surface. A motor is mounted on the frame and is drivingly connected to the blade for rotatably driving the blade. An ergonomically-designed handle assembly is also mounted on the frame, and an arm of the assembly extends along a first plane oriented approximately parallel to the work surface when the frame and blade are located in the lowered, work position, and a handle projects downwardly from the arm and extends along a second plane oriented at an angle of at least approximately 50° relative to the first plane. A trigger switch is positioned on the underside of the handle for engagement by at least the index and middle fingers of the hand to thereby depress the trigger and actuate the motor and blade. A safety switch is coupled to the trigger for selectively releasing the trigger, and is positioned opposite the trigger at the junction of the handle and arm for facilitating its engagement by the thumb of the same hand engaging the trigger to release and in turn depress the trigger for actuating the motor and blade.

16 Claims, 9 Drawing Sheets

POWER SAW HAVING AN ERGONOMICALLY-DESIGNED HANDLE AND SAFETY SWITCH

FIELD OF THE INVENTION

The present invention relates to power saws, and more particularly, to a power saw, such as a power miter saw or chop saw, having a pivotally-mounted handle for moving a rotating blade into and out of engagement with a workpiece, and further having a safety switch connected to a trigger switch and requiring simultaneous actuation of the safety and trigger switches to operate the saw.

BACKGROUND INFORMATION

Prior art power miter saws typically comprise a frame pivotally mounted adjacent to a planar work surface for supporting a workpiece, an arbor rotatably mounted on the frame and carrying a saw blade, and a motor having a shaft either connected directly to, or coupled through a gear train to the arbor for rotatably driving the blade. A handle typically projects outwardly from the frame to permit a user to pivotally move the frame and blade between an upper rest position and lower work position with the blade in engagement with a workpiece. A trigger switch is typically mounted on the handle and electrically connected to the motor to actuate the motor and blade.

In order to prevent accidental actuation of the motor, a safety switch is typically releasably connected to the trigger switch, and both the safety and trigger switches must be simultaneously actuated to operate the saw blade. In many prior art miter saws, the safety switch is a button-type switch mounted on the left-hand side of the handle. In order to operate the saw, the handle must be gripped with the right hand, and the user then simultaneously depresses the button-like safety switch with the right thumb while squeezing the trigger with one or more of the other fingers of the same hand. Because the safety switch is located on the left-hand side of the handle, this type of saw is difficult, if not impossible to operate with the left hand.

In many such power saws, the handle includes a base or stem which is mounted to the frame and a grip including the trigger and safety switches projecting from the base. Frequently, the handle is designed so that when the frame is in its lower work position, the grip is oriented downwardly at a slight angle, typically less than 45°, relative to the horizontal. The relatively slight downward orientation of the grip may require a user's hand to be flexed downwardly relative to the forearm in a somewhat unnatural position when operating the saw. This hand position, particularly when combined with an inconveniently located safety switch as described above, can be relatively uncomfortable and thus undesirable for operating a power saw.

Accordingly, it is an object of the present invention to provide a power saw, such as a miter saw or chop saw, having an ergonomically-designed handle and safety switch providing for greater comfort and ease of use than the prior art saws as described above.

SUMMARY OF THE INVENTION

The present invention is directed to a power saw, such as a power miter saw or chop saw, comprising an approximately planar work surface for supporting a workpiece, a frame pivotally mounted adjacent to the work surface, and a blade rotatably supported on the frame above the work surface. The frame and blade are pivotable between an upper, non-work position spaced away from the work surface, and a lower, work position located toward the work surface for engaging with the blade a workpiece supported on the work surface. A motor is mounted on the frame and is drivingly connected to the blade for rotatably driving the blade.

An ergonomically-designed handle assembly is also mounted on the frame, and includes an arm extending along a first plane oriented approximately parallel to the work surface when the frame and blade are located in the lowered, work position, and a handle projecting downwardly from the arm and extending along a second plane oriented at an angle of at least approximately 50° relative to the first plane. A trigger is electrically connected to the motor, and is positioned on the underside of the handle for facilitating engagement of the trigger by at least one of the index through pinkie fingers of a user's hand in order to grip the handle and thereby depress the trigger to actuate the motor and blade. A safety switch is coupled to the trigger for releasing the trigger to actuate the motor and blade, and is positioned on the upper side of the handle assembly at the junction of the handle and arm for facilitating engagement of the safety switch with the thumb of the same hand engaging the trigger to release and in turn depress the trigger for actuating the motor and blade.

The handle assembly preferably defines a switch lobe formed at the junction of the arm and handle and projecting outwardly therefrom. In this embodiment, the safety switch is preferably pivotally mounted to the handle assembly, and includes a thumb grip extending over the lobe and movable between an off position with the safety switch in engagement with the trigger, and an on position with the safety switch spaced adjacent to the trigger to permit movement of the trigger to actuate the motor and blade. The trigger preferably defines an elongated gripping surface extending along at least approximately one third the length of the handle, and the handle defines a stop surface spaced below the trigger and projecting outwardly from the handle for supporting the hand.

One advantage of the present invention is that the unique configuration of the handle assembly, and particularly the angular orientation of the handle relative to the arm and planar work surface, permits a user to comfortably grasp the handle in a more natural position in comparison to the prior art power saws described above. In addition, the location of the safety switch on the topside of the handle assembly at the junction of the arm and handle facilitates the ability of a user to simultaneously actuate both the safety and trigger switches while grasping the handle. The top, central location of the safety switch also permits both right and left-handed use. In addition, the preferred pivotally-mounted safety switch and lobe construction is particularly advantageous with respect to providing operator comfort and ease of use.

Other advantages of the present invention will become apparent in view of the following detailed description and accompanying drawings.

DETAILED DESCRIPTION OF THE PREFERRED EMBODIMENTS

Figure 1:
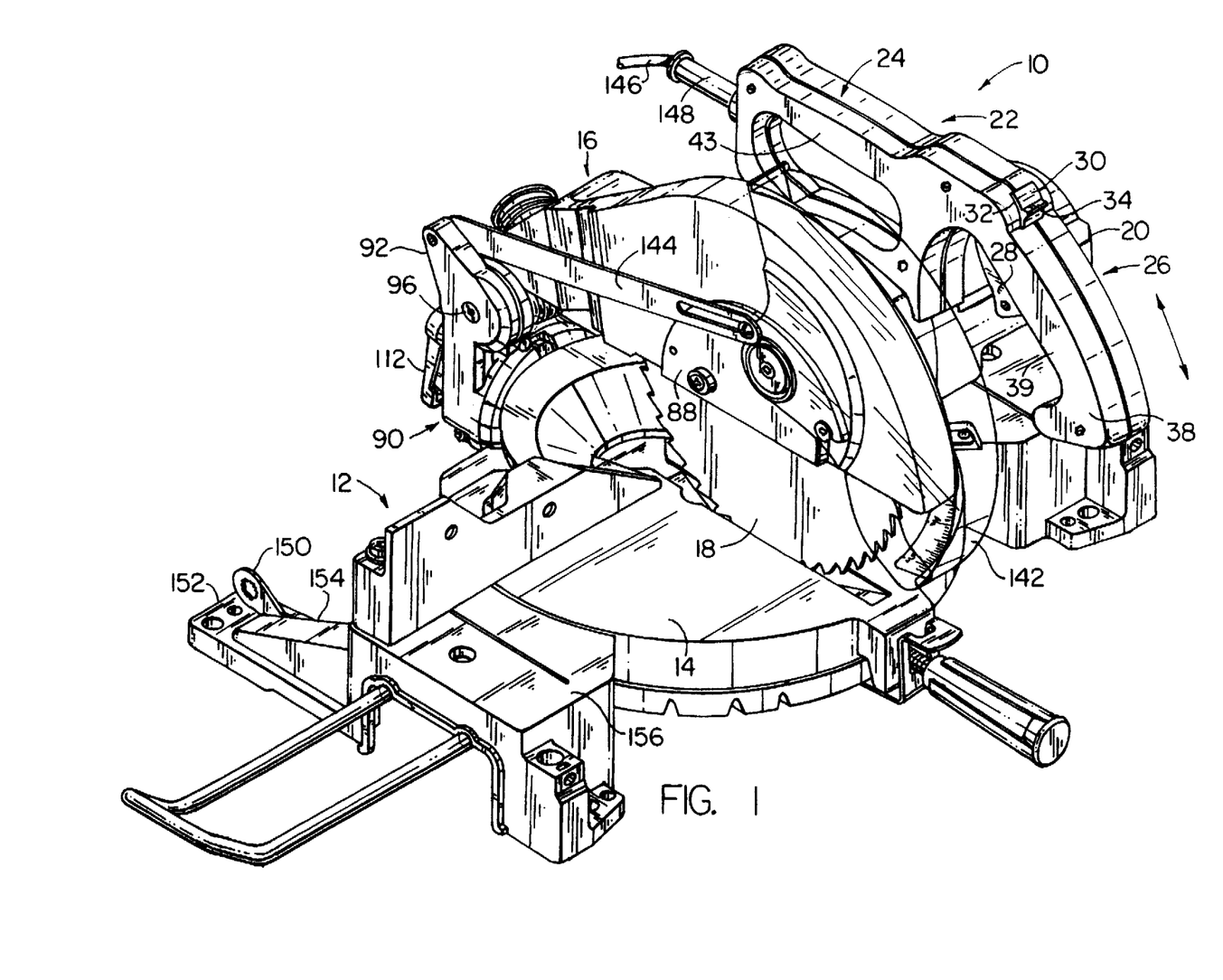
FIG. 1 is a perspective view of a compound miter saw embodying the present invention.
Figure 2:
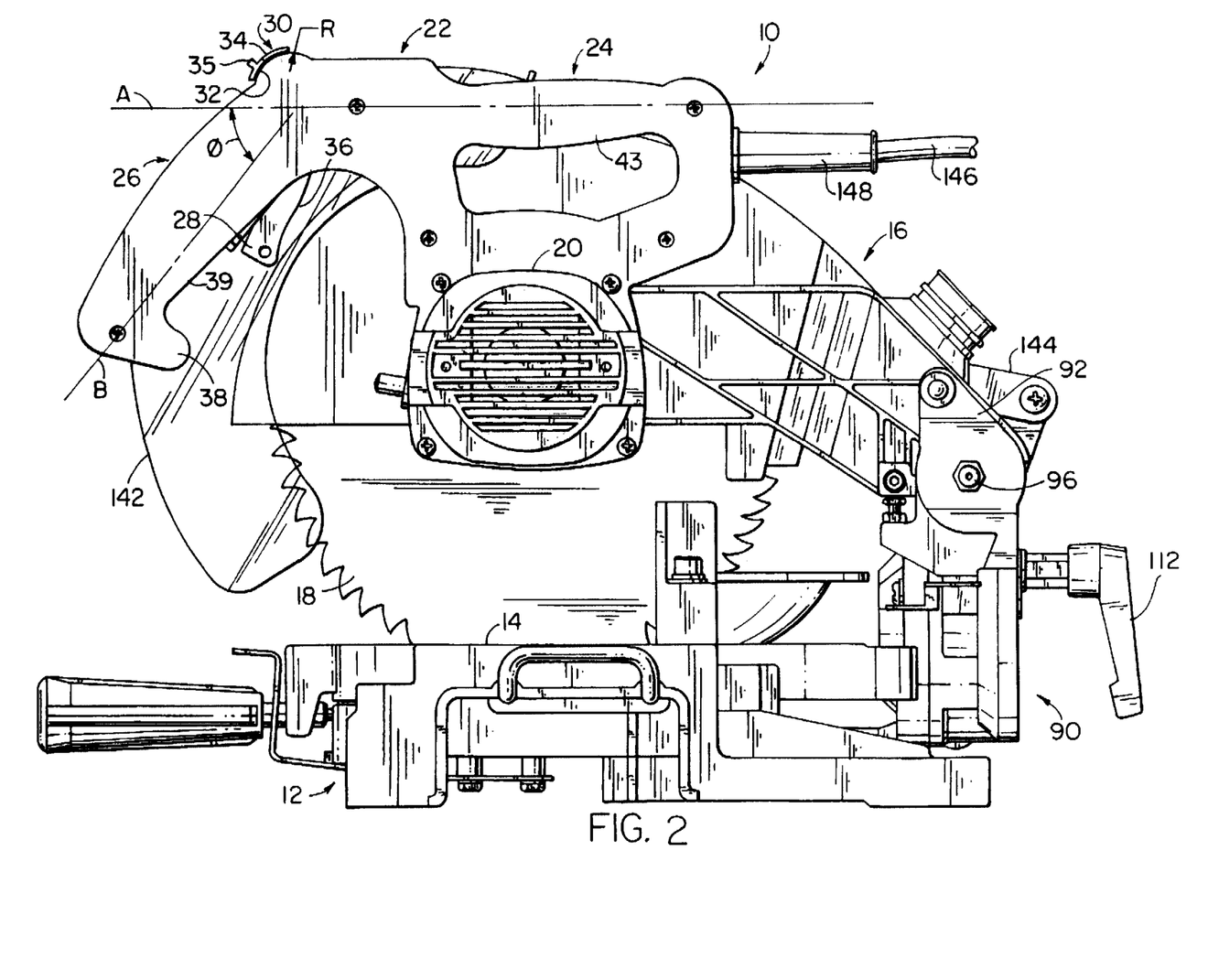
FIG. 2 is a side elevational view of the miter saw of FIG. 1 viewed from the right side of FIG. 1.

In FIG. 1, a compound miter saw embodying the present invention is indicated generally by the reference numeral 10. The miter saw 10 comprises a base 12 including an approximately planar work surface 14. A frame 16 is pivotally mounted to the base 12 and projects over the work surface 14, and a blade 18 is rotatably supported on the frame above the work surface. A motor 20 is mounted on the frame 16 and is drivingly connected to the blade 18 for rotatably driving the blade. As indicated by the arrows in FIG. 1, the frame 16 and blade 18 are pivotable between an upper, non-work position spaced away from the work surface 14, and a lower, work position located toward the work surface for engaging with the blade a workpiece (not shown) supported on the work surface. In FIGS. 1 and 2, the frame and blade are illustrated in their lowermost work position with the lower edge of the blade received within a slot formed in the work surface. As will be recognized by those skilled in the pertinent art, although the present invention is described herein with reference to a compound miter saw, it may equally be applied to numerous other types of power saws, such as other types of miter saws and chop saws. Similarly, the term "blade" as used herein is intended to contemplate any of numerous different types of saw blades, or other types of tools that may be used in power saws embodying the present invention, such as abrasive wheels or disks used on chop saws.

An ergonomically-designed handle assembly 22 is also mounted on the frame 16, and as shown best in FIG. 2, includes an arm 24 extending along a first plane "A" oriented approximately parallel to the work surface 14 when the frame and blade are located in the lowered, work position, and a handle 26 projecting downwardly from the arm 24 and extending along a second plane "B" oriented at an angle Ø relative to the first plane "A". In accordance with the present invention, the angle Ø is at least approximately 50°, and is preferably within the range of approximately 50° through 60°.

A trigger 28 is electrically connected to the motor 20, and is positioned on the underside of the handle 26 so that a user may grip the handle and engage the trigger with at least one of the index through pinkie fingers of the same hand to in turn depress the trigger and actuate the motor and blade. A safety switch 30 is releasably coupled to the trigger 28, and is positioned on the upper side of the handle assembly 22 at the junction of the handle 26 and arm 24 for facilitating engagement of the safety switch with the thumb of the same hand engaging the trigger to release and in turn depress the trigger for actuating the motor and blade.

As shown best in FIG. 2, the preferred embodiment of the handle assembly 22 includes a switch lobe 32 formed at the junction of the arm 24 and handle 26, and a thumb grip 34 of the safety switch 30 is pivotally mounted to the handle and extends over the lobe. As indicated by the arrows in FIG. 2, the thumb grip 34 may be engaged by a user's thumb and pivoted between an "off" position with the safety switch in engagement with the trigger, and an "on" position with the safety switch spaced adjacent to the trigger to permit movement of the trigger to actuate the motor and blade. As shown best in FIG. 2, the switch lobe 32 projects outwardly from the junction of the arm and handle, and is defined by a smooth radius "R" to facilitate the ability of a user to locate and engage the thumb grip and in turn pivotally operate the switch. As also shown in FIG. 2, the underside of the thumb grip 34 is defined by a radius substantially matching the radius "R" in order to accommodate pivotal movement of the switch over the lobe. The thumb grip 34 also defines a raised rib 35 projecting outwardly from the top side of the grip to facilitate engagement of the grip by a user's thumb.

Figures 4, 5, 6:
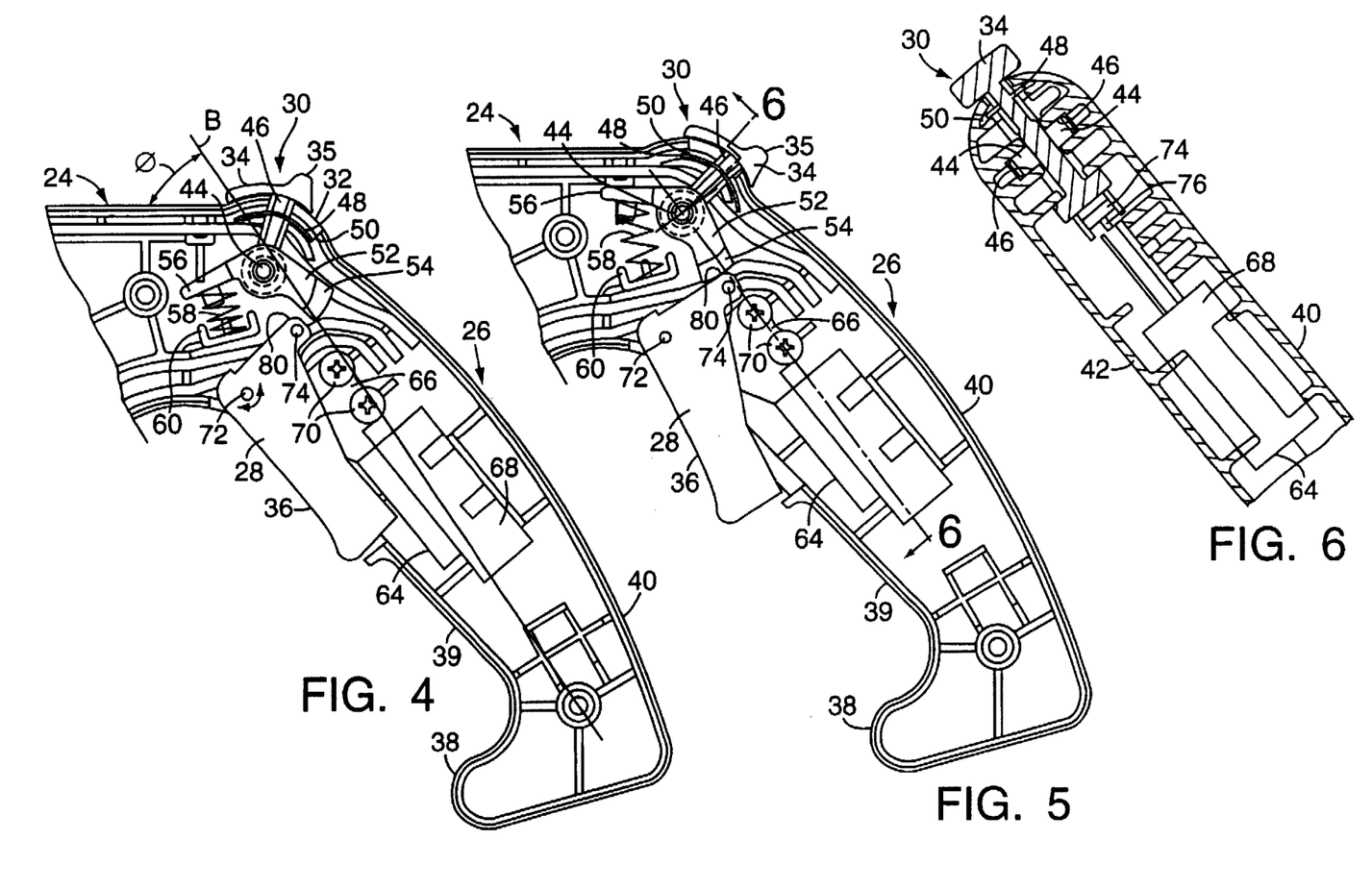
FIG. 4 is a partial, cross-sectional view of the handle assembly of the miter saw of FIG. 1 illustrating the safety and trigger switches in their "on" position.
FIG. 5 is a partial, cross-sectional view of the handle assembly of FIG. 4 illustrating the safety and trigger switches in their "off" position.
FIG. 6 is a partial, cross-sectional view of the safety and trigger switches taken along line 6—6 of FIG. 5.

As shown best in FIGS. 2, 4 and 5, the trigger 28 defines an elongated gripping surface 36 extending along the second plane "B" preferably throughout at least approximately one third the length of the handle 26 for engagement by at least the index and middle fingers of the hand. The handle 26 defines at its base a lobe 38 projecting outwardly from the handle and forming a stop surface, and further defines an elongated gripping surface 39 extending between the lobe and trigger for engagement by the fourth and pinkie fingers of the hand.

Figure 3:
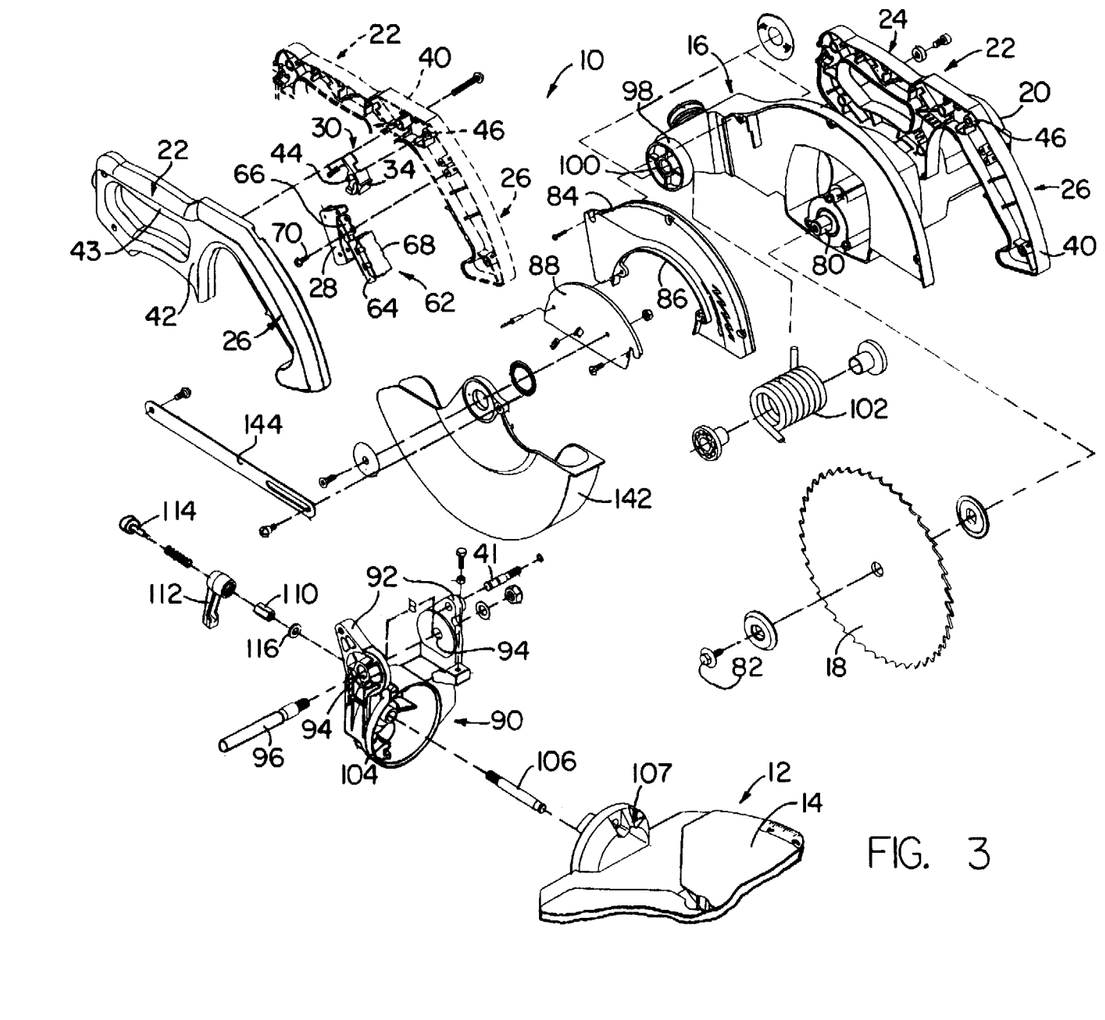
FIG. 3 is an exploded perspective view of the frame and handle assembly of the miter saw of FIG. 1 with parts removed for clarity.
Figures 8, 10:
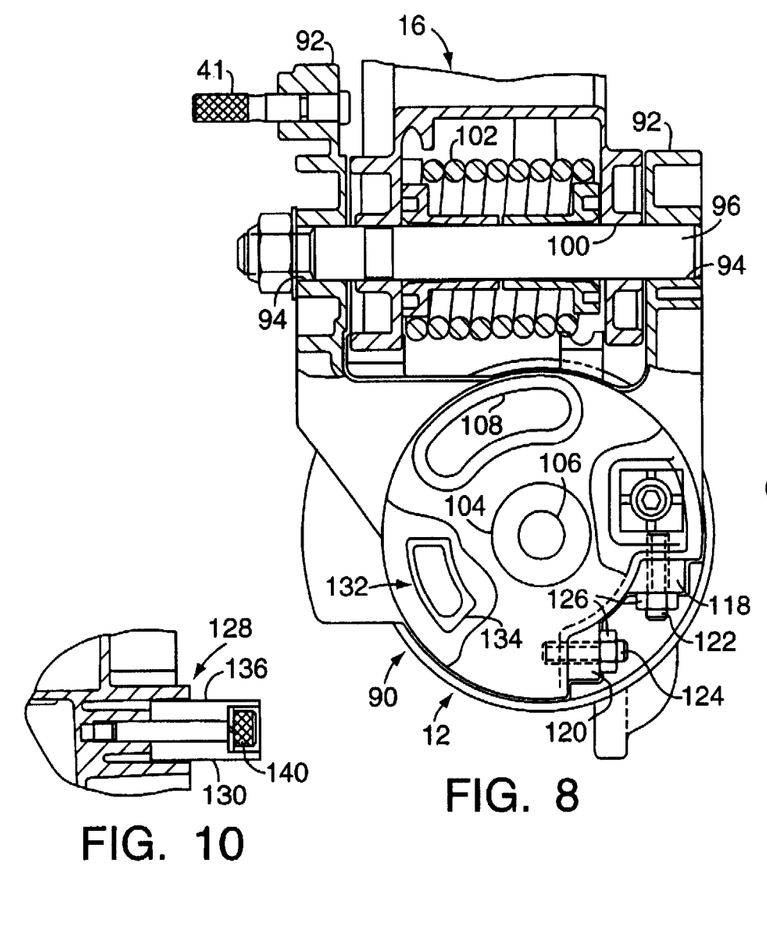
FIG. 8 is a partial cross-sectional view of the compound joint housing of the power saw of FIG. 1 illustrating the 45° and 90° bevel stops for limiting the angular movement of the frame and saw blade.
FIG. 10 is a partial, cross-sectional view taken along line 10—10 of FIG. 9 illustrating the first bevel stop in further detail.
Figure 9:
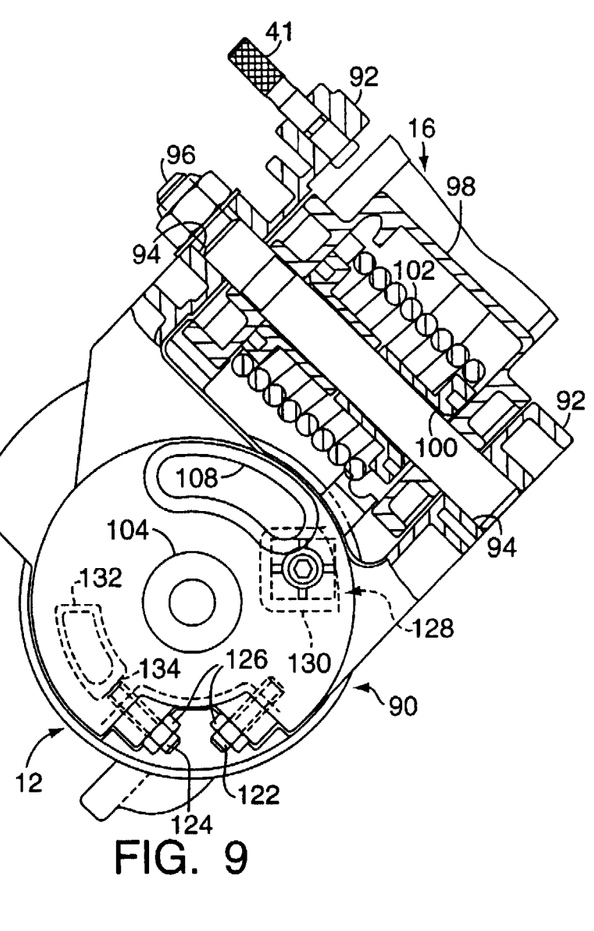
FIG. 9 is a partial cross-sectional view of the compound joint housing of FIG. 8 showing the frame and joint housing tilted in the 45° left position.

As shown in FIG. 3, the handle assembly 22 includes a two-piece frame formed by a first arm and handle section 40 fixedly secured to the frame 16, and a matching second arm and handle section 42 connected to the first section by suitable fasteners (not shown) and defining a hollow interior for mounting various components, including the trigger 28 and safety switch 30. As shown in FIGS. 1, 2 and 3, the arm portion of each section 40 and 42 defines an elongated grip 43 extending along the first plane "A" and forming an elongated gripping surface. As shown in FIGS. 8 and 9, a locking pin 41 is slidably received through an upstanding flange of the base 12 and is engageable within a corresponding aperture (not shown) formed in the frame 16 for locking the frame in its lowermost position. Accordingly, when the saw 10 is not in use, the locking pin 41 may be pushed inwardly to engage the frame and thereby lock the frame in its lowermost position, and the saw may in turn be lifted by gripping the elongated grip 43 with either hand to conveniently transport the saw.

As shown in FIGS. 3, 4 and 5, the safety switch 30 includes a mounting pin 44 projecting outwardly from opposite sides of the switch, and received within corresponding apertures 46 formed in each arm and handle section 40 and 42 for pivotally mounting the safety switch to the handle assembly. As shown best in FIGS. 4 through 6, the safety switch 30 further includes a switch arm 46 extending radially between the pivot pin 44 and thumb grip 34, and a curved guide member 48 projecting laterally from opposite sides of the switch arm and received within corresponding slots 50 formed in the first and second arm and handle sections 40 and 42. As shown in FIGS. 4 and 5, the guide member 48 and each guide slot 50 are defined by a radius of curvature approximately equal to the radius "R" of the switch lobe 32, and provide lateral support for the safety switch when pivoted between its "on" and "off" positions.

As also shown best in FIGS. 4 and 5, the safety switch 30 further includes a locking arm 52 projecting radially from the pivot pin 44 and spaced angularly from the switch arm 46. The locking arm 52 defines on its free end a first cam-like locking surface or lobe 54 for selectively locking and releasing the trigger. A biasing arm 56 also projects radially from the pivot pin 44 on approximately the opposite side of the pivot pin relative to the locking arm 52. A coil spring 58 is seated within a recessed flange 60 of the handle assembly and engages the biasing arm 56 for normally urging or biasing the safety switch in the clockwise direction in FIGS. 4 and 5, and thus into the "off" position.

As shown best in FIG. 3, the trigger 28 is part of a trigger switch assembly 62 further including a switch frame 64 defining a mounting flange 66, and a switch housing 68 containing the contacts (not shown) which are electrically connected to the motor 20. As shown best in FIGS. 4 and 5, the flange 66 of the switch assembly is mounted to the inside wall of the first arm and handle section 40 by a pair of suitable fasteners 70. The trigger 28 is pivotally mounted at one corner to the switch frame 64 by a first pin 72, and the adjacent corner of the trigger is pivotally connected by a second pin 74 to one end of a plunger 76 (FIG. 6). The other end of the plunger 76 is received within the switch housing 68 and is adapted to actuate the switch in response to movement of the trigger. When depressed, the trigger pivots inwardly about the first pin 72 into the "on" position shown in FIG. 4. This in turn causes the second pin 74 to pull the plunger 76 away from the switch housing 68 to actuate the switch and operate the saw. Then, when the trigger is released, it is normally biased or urged outwardly into its "off" position, as shown in FIG. 4, which causes the plunger 76 to move back toward the switch housing to open the switch and turn off the saw.

As shown best in FIG. 5, the upper corner of the trigger 28 defines a second locking surface or lobe 80 so that when the trigger is located in its "off" position, the first locking lobe 54 of the safety switch engages the second locking lobe 80 to thereby block and otherwise prevent movement of the trigger. In order to actuate the trigger, a user must first pivot the thumb grip 34 of the safety switch in the forward or counter-clockwise direction in FIGS. 4 and 5. This in turn causes the first locking lobe 54 to pivot into a position spaced adjacent to the second locking lobe 80 (FIG. 4), thereby permitting the trigger 28 to be pivoted inwardly about its first pin 72 to actuate the motor and thus operate the saw. While the trigger 28 is depressed in its "on" position (FIG. 4), the safety switch 30 may be released and the first locking lobe 54 will rest against the adjacent surface of the trigger. Then, when the trigger 28 is released, the upper corner of the trigger defining the second locking lobe 80 swings downwardly from the "on" position of FIG. 4 to the "off" position of FIG. 5. The coil spring 58 simultaneously urges the biasing arm 56 of the safety switch in the clockwise direction of FIGS. 4 and 5, which in turn causes the first locking lobe 54 to return to the "safety" or "off" position of FIG. 5 to prevent movement of the trigger.

As shown in FIG. 3, the power saw 10 further includes an arbor 80 journaled to the frame 16 and drivingly connected to the motor 20, and the saw blade 18 is fixedly mounted to the arbor by a fastener 82 and suitable washers. A blade housing 84 is attached by fasteners to the opposite side of the frame relative to the motor 20 and defines a protective enclosure for the upper portion of the saw blade 18. The housing 84 defines a cut-out 86 for accessing the fastener 82 to change the blade, and a face plate 88 is removably attached by fasteners to the housing to cover the cut-out when the saw is in use.

Figure 7:
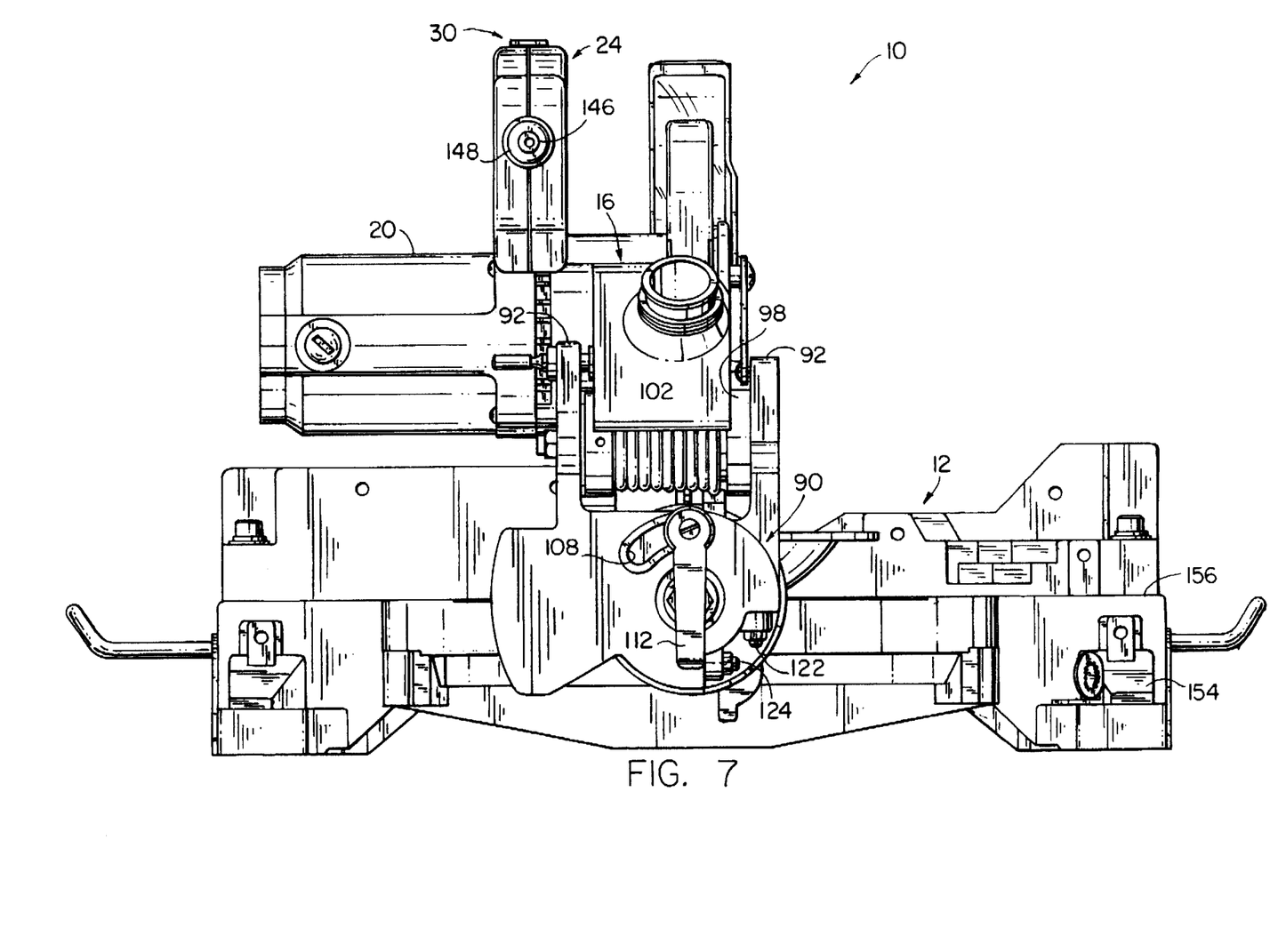
FIG. 7 is a rear elevational view of the power saw of FIG. 1.

As shown in FIGS. 3 and 7, the base 12 includes a compound joint housing 90 which is pivotally mounted adjacent to the work surface 14 for supporting the frame 16 and permitting adjustment of the angular position of the blade relative to the plane of the work surface in order to cut, for example, a miter surface or joint in a workpiece. In the embodiment of the present invention illustrated, the frame and blade are adjustable throughout a 45° range, from the position shown typically in FIGS. 1 and 8 with the plane of the blade oriented at approximately 90° relative to the work surface, through a position shown typically in FIG. 9 with the plane of the blade oriented at approximately 45° relative to the work surface.

As shown best in FIGS. 3, 8 and 9, the compound joint housing 90 defines a pair of upstanding flanges 92 spaced relative to each other and defining a pair of aligned apertures 94 for receiving a first pivot pin 96. The frame 16 includes a corresponding base 98 which is received between the upstanding flanges 92, and which defines a mounting aperture 100 for receiving the first pivot pin 96 and pivotally mounting the frame to the compound joint housing. As shown best in FIGS. 8 and 9, a torsion spring 102 is operatively connected between the base 98 of the frame and the joint housing 90 to normally urge or bias the frame and blade toward the upper, non-work position.

The compound joint housing 90 further defines a mounting flange 104 forming a mounting aperture extending through the flange for receiving a second pivot pin 106, and the second pivot pin is in turn fixedly secured to a mounting pod 107 formed on the base 12 for permitting pivotal movement of the compound joint housing and frame relative to the base, as described above. As shown best in FIGS. 8 and 9, the compound joint housing 90 defines an elongated, curved aperture 108, which as indicated in FIG. 3, receives a stud 110 fixedly secured on one end to the mounting pod 107. As also shown in FIG. 3, a locking handle 112 is threadedly attached by a fastener 114 to the other end of the stud; and a washer 116 is seated between the locking handle and the peripheral surface of the curved aperture 108 for engaging the peripheral surface in response to rotation of the locking handle to thereby lock the frame and blade in the desired angular position.

As shown in FIGS. 8 and 9, the outer wall of the compound joint housing 90 defines a first mounting flange 118 and a second mounting flange 120 spaced approximately 45° from the first mounting flange. A first stud 122 is threadedly received through the first mounting flange, a second stud 124 is threadedly received through the second mounting flange, and a pair of nuts 126 are each threadedly attached to a respective stud to fix the extent to which the stud projects through the respective mounting flange. The pod 107 of the base 12 defines a first bevel stop 128 defining a first stop surface 130 oriented approximately parallel to the plane of the work surface 14, and a second bevel stop 132 defining a second approximately planar stop surface 134 spaced angularly from the first stop surface at an angle of about 67.5°.

When the frame 16 is pivoted to the right in FIG. 8, the first stud 122 engages the first stop surface 130 to limit the angular movement of the frame in that direction to the 90° position, as shown. Similarly, when the frame 16 is pivoted to the left in FIG. 9, the second stud 124 engages the second stop surface 134 to limit the angular movement of the frame in that direction to the 45° "left" position, as shown. The positions of each of the first and second studs 122 and 124, respectively, may be adjusted by rotating the respective nut 126 to calibrate the angular position of the frame and blade. As shown in FIG. 10, the first stop surface 130 is formed by a block 136 fixedly attached by a threaded fastener 140 to a flange formed by the first bevel stop 128.

As shown best in FIGS. 1 and 3, the miter saw 10 further includes a rotatable blade guard assembly comprising a transparent blade guard 142 mounted to the face plate 88 for covering the lower portion of the blade when located in the upper, non-work position; and a straight link 144 is connected between one of the upstanding flanges 92 and the blade guard for rotating the blade guard in the counter-clockwise direction of FIG. 3 to expose the blade in response to movement of the frame and blade into the lower, work position.

As shown in FIG. 1, a power cord 146 is connected through a strain-relief bushing 148 to the opposite end of the arm 24 relative to the handle 26 and includes a suitable connector for attachment to a power outlet. The other end of the power cord 146 extends through the hollow interior of the arm and handle assembly 22, and is connected to the trigger switch assembly 62 in a manner known to those of ordinary skill in the pertinent art to provide electrical power to the motor 20.

Figure 11:
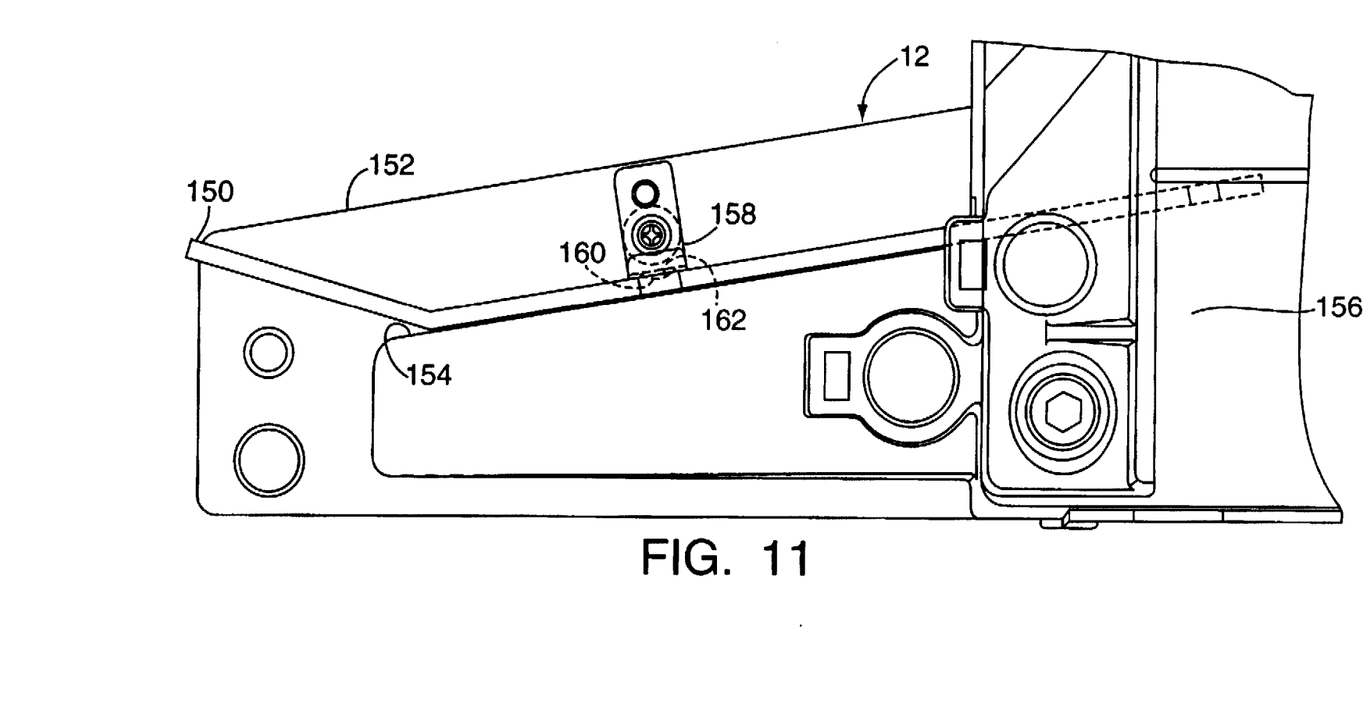
FIG. 11 is a partial, top plan view of the base portion of the power saw of FIG. 1 illustrating the system for storing a wrench blade.

As shown in FIGS. 1 and 11, the power saw 10 further includes a unique system for storing a blade wrench 150 which may be used to detach and attach the nut 82 (FIG. 3) in order to replace the saw blade. The base 12 of the saw includes two end sections for supporting the work surface 14, and each end section defines a bottom wall 152 for supporting the power saw on a table or other support surface, a side wall 154 projecting upwardly from each base wall, and a top wall 156 extending inwardly and adjacent to the work surface 14. As shown in FIG. 11, an upstanding spring clip 158 is fixedly attached to the bottom wall 152 of one end section, and is spaced adjacent to the respective side wall 154 for receiving the shaft of the blade wrench 150 therebetween. The spring clip 158 defines a nipple or like protrusion 160 projecting outwardly toward the adjacent side wall, and the blade wrench 150 defines a corresponding dimple or recess 162 for receiving the nipple and fixing the blade wrench in place.

As shown in FIG. 11, the blade wrench 150 is stored by slipping the wrench between the spring clip 158 and side wall 154 until the nipple of the spring clip snaps into the dimple of the wrench. The force applied to the wrench by the spring clip is sufficient to hold the wrench in place, yet preferably light enough to permit the wrench to be easily removed. As shown in FIGS. 1 and 11, the blade wrench 150 is conveniently stored on the back side of the saw so that the wrench is out of the way during operation of the saw, yet may be conveniently accessed when needed.

Figure 12:
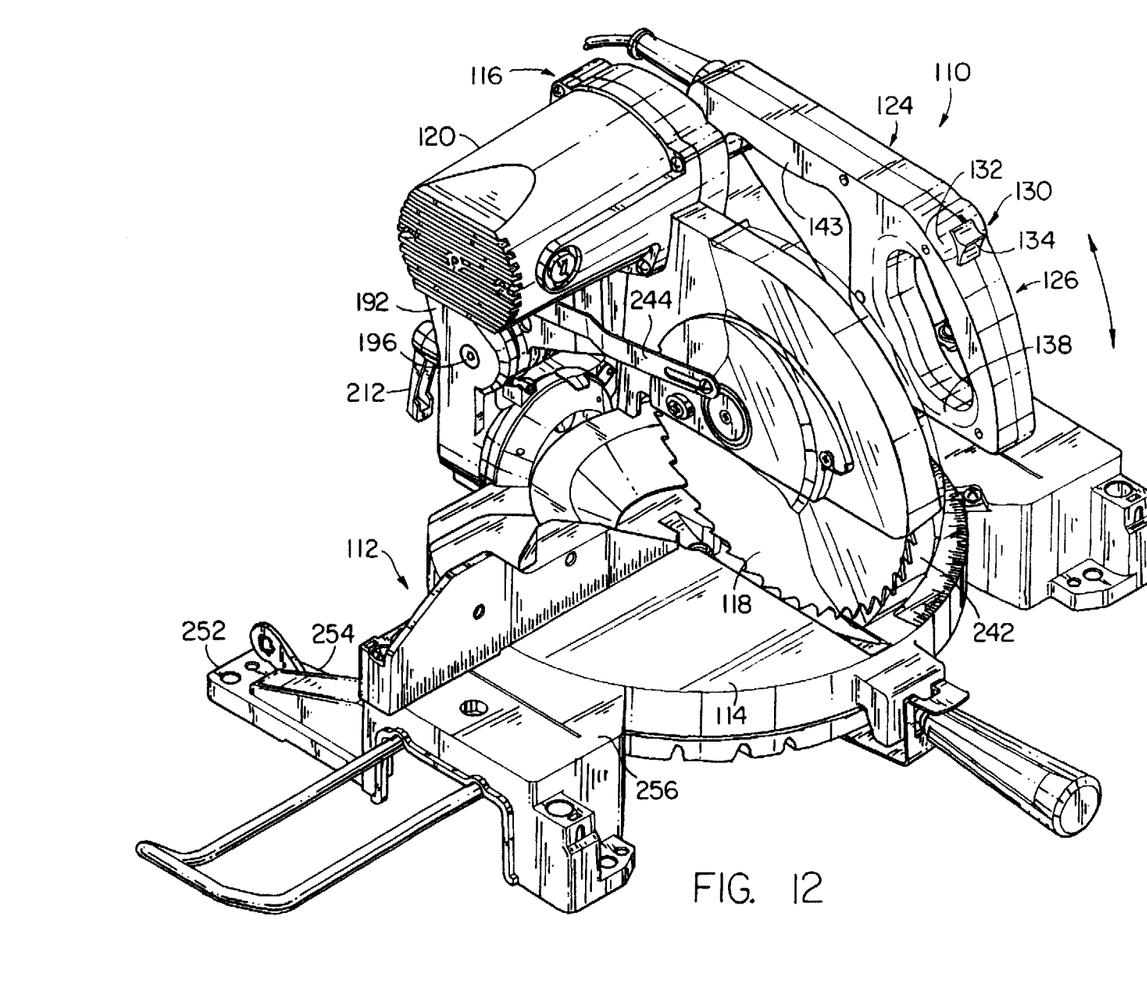
FIG. 12 is a perspective view of a second embodiment of a compound miter saw of the present invention.
Figure 13:
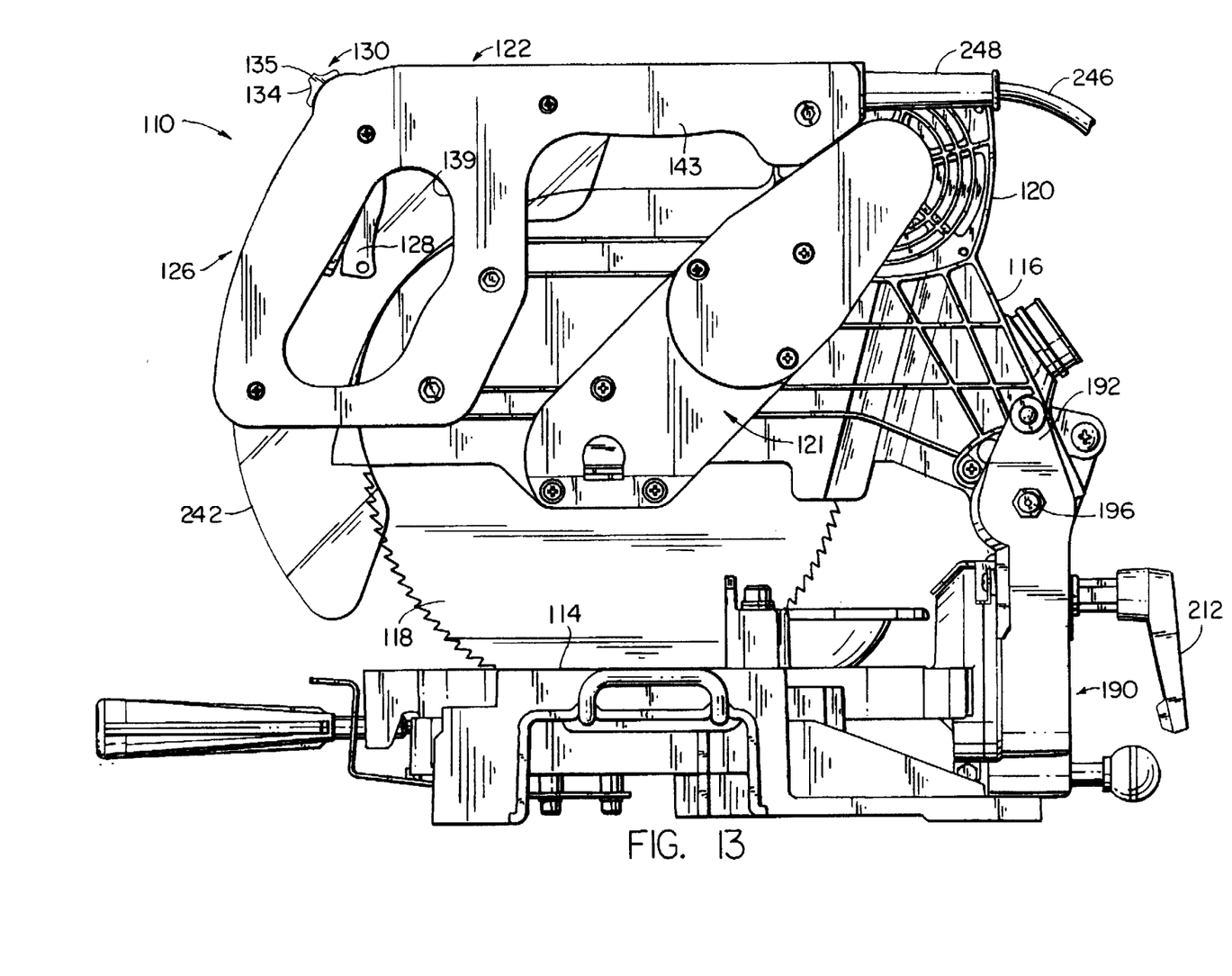
FIG. 13 is a side elevational view of the miter saw of FIG. 7 viewed from the right side of FIG. 12.

Turning to FIGS. 12 and 13, a second embodiment of a compound miter saw of the present invention is indicated generally by the reference numeral 110. The power saw 110 is the same in many respects as the power saw 10 of the previous embodiment, and therefore like reference numerals preceded by either the numeral 1 or 2, respectively, are used to indicate like elements. A primary difference of the power saw 110 in comparison to the saw 10 is the drive system for rotatably driving the saw blade, and the effect of this drive system on the location of the motor and configuration of the handle assembly.

More specifically, the power saw 110 comprises a dual-belt drive as disclosed and claimed in the co-pending U.S. patent application entitled, "A Power Saw Having A Dual-Belt Drive", which is being filed on even date herewith, is assigned to the Assignee of the present invention, and is hereby expressly incorporated by reference as part of the present disclosure. As shown in FIGS. 12 and 13, the motor 120 is mounted in the upper corner of the frame 116 rather than in-line with, or adjacent to the rotational axis of the saw blade 118. As shown in FIG. 13, the power saw 110 further comprises a dual-belt drive system mounted within a drive-train housing 121 extending between the motor 120 and the axis of the saw blade.

Accordingly, rather than construct the handle assembly so that it is spaced above the motor 120, the arm 124 of the handle assembly 122 projects rearwardly from the motor. As shown best in FIG. 13, the top surface of the arm 122 is approximately parallel to the plane A (and to the work surface 114) when the frame 116 and blade 118 are pivoted downwardly into the lower, work position. In addition, the stop surface 138 of the handle 126 extends inwardly and is fixedly secured by fasteners to the frame 116, and defines an enclosed aperture 139 for receiving the fingers of a user's hand.

As will be recognized by those skilled in the pertinent art, numerous changes and modifications may be made to the above-described and other embodiments of the present invention without departing from its scope as defined in the appended claims. For example, the arm and/or handle of the present invention may take any of numerous different shapes while still providing a handle oriented downwardly at the desired angle, or within the desired angular range with respect to the horizontal when the saw blade is located in its lowermost work position. Similarly, the pivotally-mounted safety switch located on the top side of the handle, preferably at the junction of the arm and handle, may take any of numerous different shapes and/or configurations. The ergonomically-designed handle and safety switch of the present invention may likewise be incorporated within any of several different types of power saws, including different types of power miter saws and chop saws. Accordingly, this detailed description of preferred embodiments is to be taken in an illustrative, as opposed to a limiting sense.

What is claimed is:

1. A power saw comprising:
   an approximately planar work surface for supporting a workpiece;
   a frame pivotally mounted adjacent to the work surface;
   a tool rotatably supported on the frame;
   a motor drivingly connected to the tool for rotatably driving the tool, wherein the frame and tool are movable between an upper, non-work position spaced away from the work surface, and a lower, work position located toward the work surface for engaging with the tool a workpiece supported on the work surface; and
   a handle assembly mounted on the frame and including:
     an arm extending along a first plane oriented approximately parallel to the work surface when the frame and tool are located in a work position;
     a handle projecting downwardly from the arm and extending along a second plane oriented at an included angle of at least approximately 50° relative to the first plane;

a trigger electrically connected to the motor, and positioned on the underside of the handle for facilitating engagement of the trigger by at least one of the index through pinkie fingers of a user's hand in order to grip the handle and thereby depress the trigger to actuate the motor and tool; and a safety switch coupled to the trigger for releasing the trigger to actuate the motor and tool, the safety switch being positioned on the upper side of the handle assembly at approximately a junction of the handle and arm for facilitating engagement of the safety switch with the thumb of the same hand engaging the trigger to release and in turn depress the trigger for actuating the motor and tool.

2. A power saw as defined in claim 1, wherein the safety switch is pivotally mounted to the handle assembly for pivotal movement between an off position in engagement with the trigger to prevent movement of the trigger, and an on position spaced adjacent to the trigger to permit movement of the trigger to actuate the motor and tool.

3. A power saw as defined in claim 2, wherein the handle assembly defines a switch lobe formed at the junction of the arm and handle and projecting outwardly therefrom, and the safety switch defines a thumb grip movable over the lobe for actuating the safety switch.

4. A power saw as defined in claim 3, wherein the safety switch further comprises a locking surface coupled to the thumb grip for pivotal movement with the thumb grip between an off position with the locking surface in engagement with the trigger for preventing movement of the trigger, and an on position with the locking surface spaced adjacent to the trigger for permitting movement of the trigger.

5. A power saw as defined in claim 4, wherein the safety switch further comprises a spring coupled to the locking surface for normally biasing the locking surface toward the off position.

6. A power saw as defined in claim 2, wherein the safety switch includes a switch arm pivotally mounted to the handle assembly, a thumb grip mounted on one end of the switch arm and projecting outwardly from the handle assembly for engagement by the thumb to actuate the safety switch, and a guide surface projecting laterally from the switch arm and received within a corresponding guide slot for slidable movement of the guide surface through the guide slot with actuation of the switch to laterally support the switch.

7. A power saw as defined in claim 1, wherein the second plane is oriented at an angle within the range of approximately 50° through 60° relative to the first plane.

8. A power saw as defined in claim 1, wherein the handle defines a finger grip on its underside adjacent to the trigger, and the finger grip extends along the second plane.

9. A power saw as defined in claim 1, wherein the trigger defines an elongated gripping surface extending along at least approximately one third the length of the handle.

10. A power saw as defined in claim 1, wherein the arm defines a gripping surface for lifting the saw.

11. A power saw as defined in claim 1, wherein the handle further defines a stop surface formed at an opposite end of the handle and projecting outwardly therefrom for supporting the hand.

12. A power saw as defined in claim 1, wherein the tool defines an axis and the handle is located above the axis of the tool.

13. A power saw as defined in claim 1, further comprising a base defining the work surface, and a compound joint housing pivotally mounted between the frame and base for adjusting the angular position of the frame and tool relative to the plane of the work surface, wherein the frame defines a first bevel stop oriented approximately parallel to the plane of the work surface, and a second bevel stop angularly spaced relative to the first bevel stop and oriented at approximately 45° relative to the plane of the work surface.

14. A power saw as defined in claim 13, wherein the tool is defined by an approximately planar saw blade, and the compound joint housing defines a first stop member engageable with the first bevel stop with the plane of the saw blade oriented at approximately 90° relative to the plane of the work surface, and a second stop member engageable with the second bevel stop with the plane of the saw blade oriented at approximately 90° relative to the plane of the work surface.

15. A power saw as defined in claim 1, further comprising:
a base defining the work surface, wherein the base defines a front side on the same side of the saw as the handle, and a back side on the opposite side of the saw relative to the handle;
a spring clip fixedly secured to the back side of the base adjacent to a side wall of the base, and defining a passageway therebetween; and
a blade wrench slidably received within the passageway and engaged by the spring clip to hold the wrench in place.

16. A power saw as defined in claim 15, wherein the spring clip defines a protuberance, and the blade wrench defines a corresponding recess for receiving the protuberance and holding the wrench in place.

* * * * *